June 11, 1929.  J. KAUFMAN ET AL  1,717,040
ELECTRICAL VAPORIZER
Filed July 27, 1928

INVENTORS
Joseph Kaufman
Moses Zaiman
BY
ATTORNEY

Patented June 11, 1929.

1,717,040

UNITED STATES PATENT OFFICE.

JOSEPH KAUFMAN AND MOSES ZAIMAN, OF BROOKLYN, NEW YORK.

ELECTRICAL VAPORIZER.

Application filed July 27, 1928. Serial No. 295,644.

This invention relates generally to vaporizers, and has more particular reference to a novel vaporizer provided with an electrical heating unit.

The invention has for an object the provision of a device of the class mentioned which is of simple durable construction, desirable and efficient in action and which can be manufactured and sold at a reasonable cost.

The invention proposes the use of a bar hingedly mounted and connected with the cover of a vaporizer container, and with electrical connections controlling the supply of current to heating units mounted in the vaporizer, and arranged upon pivoting for simultaneously opening the cover and breaking the electrical connection to the heating units. The said cover is formed with a nozzle, and the said bar is preferably attached on one end of the cover.

For further comprehension of the invention, and of the object and advantages thereof, reference will be had to the following description and accompanying drawings, and to the appended claims in which the various novel features of the invention are more particularly set forth.

In the accompanying drawing, forming a material part of this disclosure:

Figure 1:
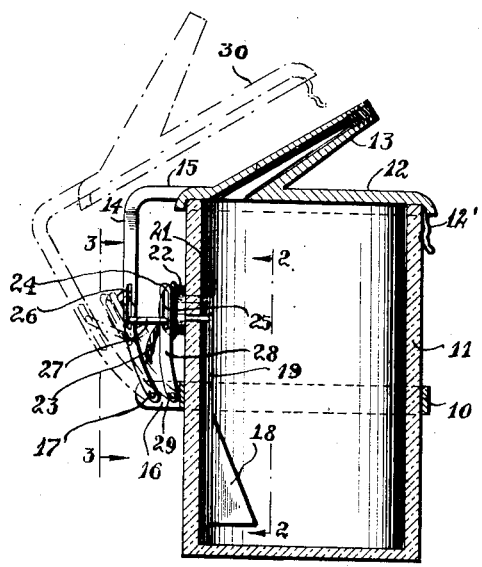
Fig. 1 is a vertical sectional view of a device constructed according to this invention.

The reference numeral 11, indicates generally the container of a vaporizer. The vaporizer is principally intended for use in the treatment of bronchial diseases, such as asthma, etc., employing benzoin or similar liquids of which the vapors have curative properties. The container should be adapted for holding such liquids without injury to the liquid or to the container.

A cover 12 provided with a clip 12', or other suitable friction lock, is adapted for closing the container and is provided with a nozzle 13 thru which vapors may leave. A vertical bar 14 has a horizontal portion 15 attached on the edge of the cover, and the bar 14 is pivotally connected with lugs projecting from a ring 10, which may be secured to or slidably mounted on the container and frictionally held in various positions. Numeral 17 indicates the pivot point between the bars, and the arrangement should be such that the cover 12 may be moved to an open position by reason of bar 14 moving about its pivot point.

An electrical heating unit 18, capable of heating liquids of the type mentioned, is supported within the container on rods 19 and 20 which electrically connect the heating unit with an electrical terminal 21, mounted in the side of the container, and extending to the outside thereof. A plug 22 connected with a power line 23, electrically engages in the terminals 21, for supplying current to the heating unit 18.

Lugs 24 project from the plug 22 and are formed with slots 25. The bar 14 is also formed with a slot 26 having its bottom on the same horizontal plane as slots 25. A link 27 extends between the slots 25 and 26 and normally rests on the bottom of the slots. An arm 28 projects from the plug and pivotally connects with the said ring 10.

In operation, the cover 12 may be swung open about 17 as a pivot, as indicated by the dot dash lines 30 and link 27 drags the plug 22 out of its terminals, 21, for cutting the current supply to the heating unit. When the cover 12 is then swung closed the plug 22 may be reengaged into the terminals 21. In the closed position of the cover the link 27 may be tilted for manually removing the plug from the socket so that the heating unit may be inoperative.

Figure 5:
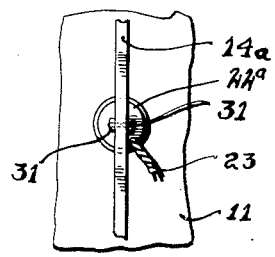
Fig. 5 is a fragmentary side elevational view, looking in the direction of the arrows 5—5 of Fig. 4.
Figure 4:
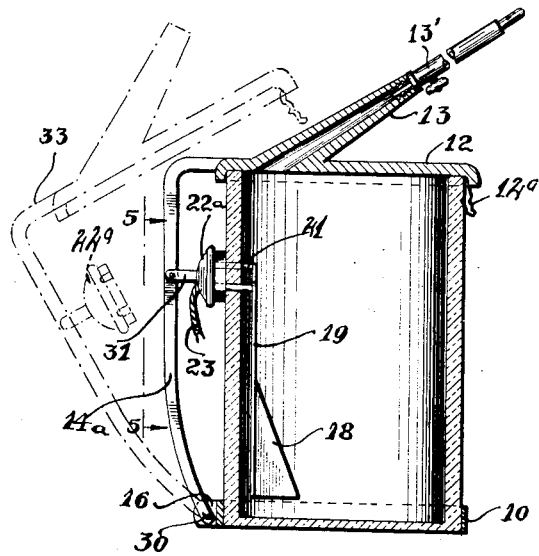
Fig. 4 is a view similar to Fig. 1, but illustrating a modified form of the device.

In Figs. 4 and 5, the cover 12 is shown attached on a bar 14ª pivoted at its lower end as at 30 on the projecting bar 16 from the ring 10, which is now shown disposed and secured on the lower part of the container. A plug 22ª provided with a power line 23, engages the socket 21, and has rear lugs 31 attached on the bar 14ª. The dot and dash lines 33 indicate the bar 14ª during motion for opening the cover, and it is pointed out that the plug 22ª is simultaneously removed from the terminals 21 for cutting the current of the heating unit.

Figure 6:
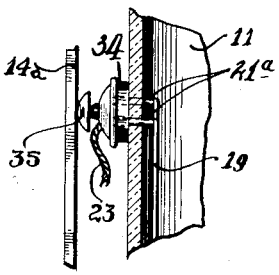
Fig. 6 is a fragmentary view similar to a portion of Fig. 1, but illustrating another modified form.

In Fig. 6 a push button switch 34 is shown conected with the cable 23 and with terminals 21ª connected to the heating unit of the device. An arm 35 projects from the bar 14ª and engages the push button switch for heating the device when the cover of the device is closed. As the bar moves for opening the cover the switch 34 is allowed to move into an inoperative position.

Figures 2, 3:
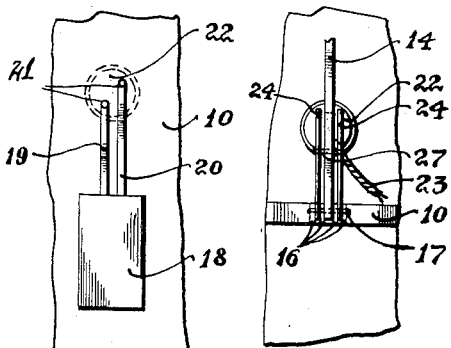
Fig. 2 is a fragmentary elevational view looking in the direction of the arrows 2—2 of Fig. 1.
Fig. 3 is a fragmentary side elevational view looking in the direction of the arrows 3—3 of Fig. 1.

As shown in Figs. 1 and 3, the narrow free end of nozzle 13 is threaded and is adapted to receive a fumigator 13'.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention what we claim as new and desire to secure by United States Letters Patent is:

1. A device of the class described, comprising a receptacle, a lid therefor, an electric heater suspended within the receptacle and connected with a pair of terminals extending thru the side of the receptacle, a bar pivotally mounted and connected with the lid, and movable for opening and closing the said lid, and simultanenously breaking or connecting a circuit including the said terminals.

2. A device of the class described, comprising a receptacle, a lid therefor, an electric heater suspended within the receptacle and connected with a pair of terminals extending thru the side of the receptacle and a bar connected with the lid and movable for opening and closing the said lid, and simultaneously breaking or connecting a circuit including the said terminals.

3. A device of the class described, comprising a receptacle, a lid therefor, an electric heater suspended within the receptacle and connected with a pair of terminals extending thru the side of the receptacle, a bar pivotally mounted and connected with the lid and movable for opening the said lid, and simultaneously breaking a circuit including the said terminals.

4. A device of the class described, comprising a receptacle, a lid therefor, an electric heater suspended within the receptacle and connected with a pair of terminals extending thru the side of the receptacle, a bar pivotally mounted and connected with the lid and movable for opening and closing the said lid, a plug engaged in the said terminals, lugs projecting therefrom and formed with slots, the said bar being also formed with a slot, and a link connected between the slots.

5. A device of the class described, comprising a receptacle, a lid therefor, an electric heater suspended within the receptacle and connected with a pair of terminals extending thru the side of the receptacle, a bar pivotally mounted and connected with the lid and movable for opening and closing the said lid, a plug engaged in the said terminals, lugs projecting therefrom and formed with slots, the said bar being also formed with a slot, and a link connected between the slots and arranged for removing the plug from the terminals upon opening of the said lid.

6. A device of the class described, comprising a receptacle, a lid therefor, an electric heater suspended within the receptacle and connected with a pair of terminals extending thru the side of the receptacle, a bar pivotally mounted and connected with the lid and movable for opening and closing the said lid, a plug engaged in the said terminals, lugs projecting therefrom and formed with slots, the said bar being also formed with a slot, and a link connected between the slots and arranged for tilting for permitting the removal of the plug without opening the cover.

7. A device of the class described, comprising a receptacle, a lid therefor, an electric heater suspended within the receptacle and connected with a pair of terminals extending thru the side of the receptacle, a bar pivotally mounted and connected with the lid and movable for opening and closing the said lid, and simultaneously breaking or connecting a circuit including the said terminals, and a plug attached on the said bar.

8. A device of the class described, a comprising a receptacle, a lid therefor, an electric heater suspended within the receptacle and connected with a pair of terminals extending thru the side of the receptacle, a bar pivotally mounted and connected with the lid and movable for opening and closing the said lid, and simultaneously breaking or connecting a circuit including the said terminals and a push button switch engaged in the terminals.

9. A device of the class described, comprising a receptacle, a lid therefor, an electric heater suspended within the receptacle and connected with a pair of terminals extending thru the side of the receptacle, a bar pivotally mounted and connected with the lid and movable for opening and closing the said lid, said bar being mounted on a ring slidably arranged on the said receptacle, a plug engaged in the said terminal, lugs projecting therefrom and formed with slots, the said bar being also formed with a slot, and a link connected between the slots and arranged for tilting for permitting the removal of the plug without opening the cover.

In testimony whereof we have affixed our signatures.

JOSEPH KAUFMAN.
MOSES ZAIMAN.